2,545,199

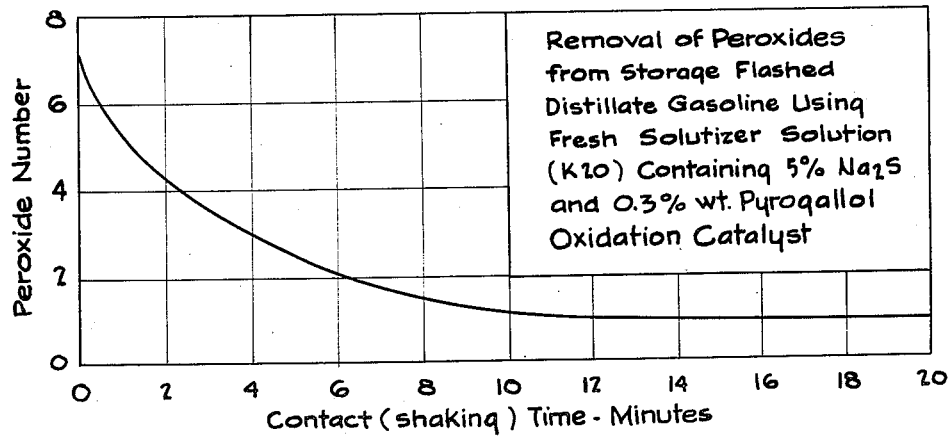
Fig. I
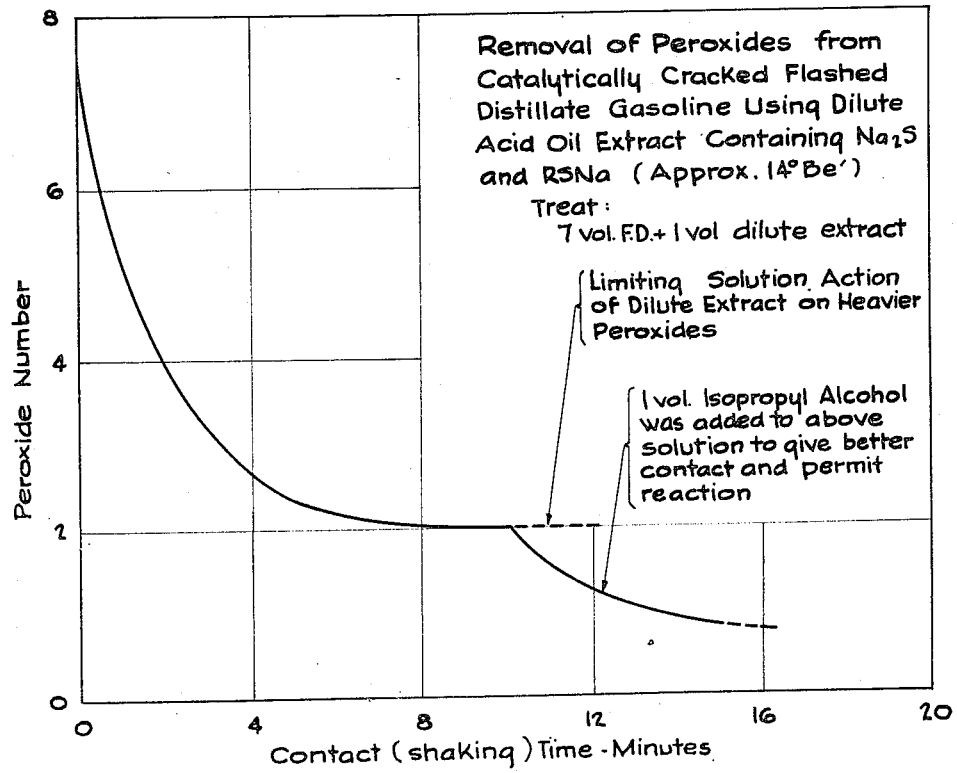
Fig. II
Inventor: Lloyd C. Fetterly
By his Agent: John H. Colvin March 13, 1951 L. C. FETTERLY 2,545,199
REMOVAL OF PEROXIDES FROM HYDROCARBONS
Filed Dec. 13, 1947 2 Sheets—Sheet 2
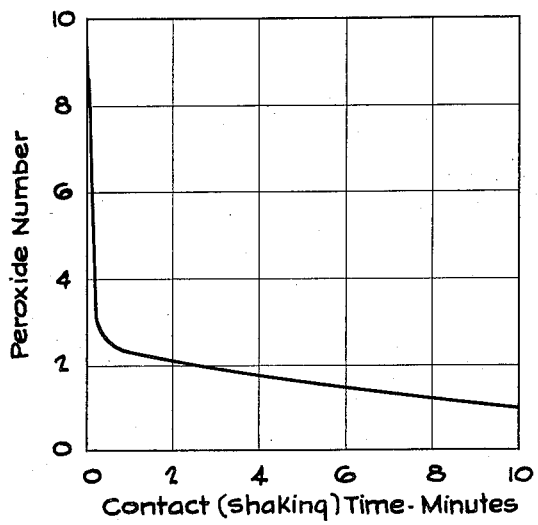
Removal of Peroxides from Aromatic Distillate (7 months in Storage) Using Strong Acid Oil Extract (24° Be')
Fig. III
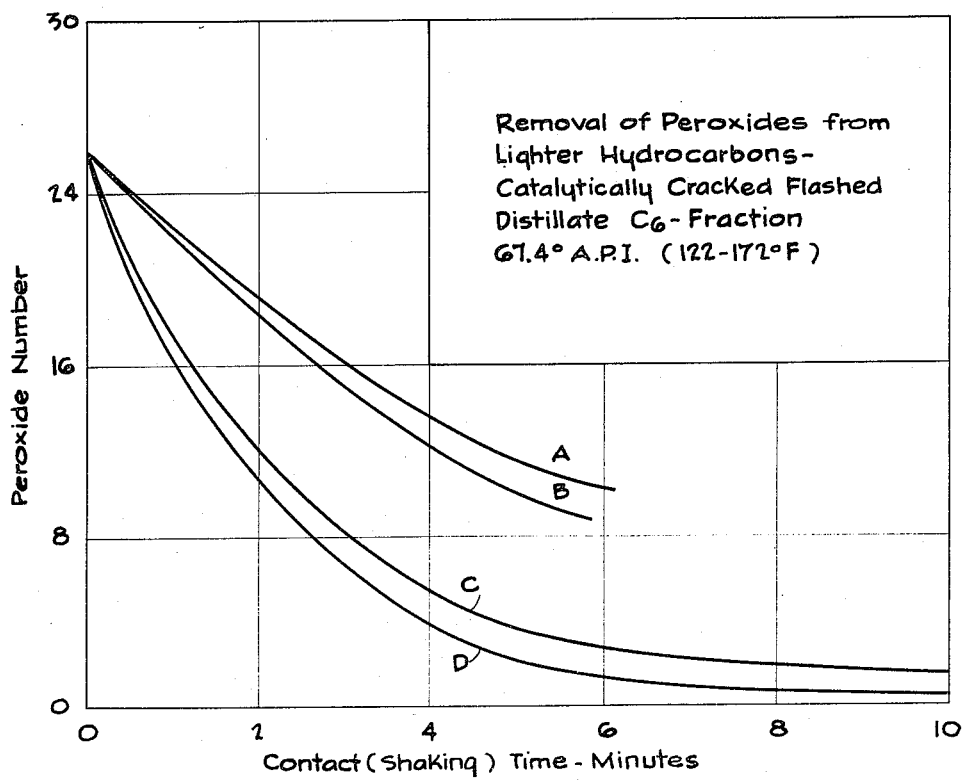
Removal of Peroxides from Lighter Hydrocarbons - Catalytically Cracked Flashed Distillate $C_6$-Fraction 67.4° A.P.I. (122-172°F)
Fig. IV
Inventor: Lloyd C. Fetterly
By his Agent: John H. Colvin Patented Mar. 13, 1951

UNITED STATES PATENT OFFICE 2,545,199

REMOVAL OF PEROXIDES FROM HYDROCARBONS

Lloyd C. Fetterly, Seattle, Wash., assignor to Shell Development Company, San Francisco, Calif., a corporation of Delaware Application December 13, 1947, Serial No. 791,647

8 Claims. (Cl. 196—41)

This invention relates to a process for removing organic peroxides from hydrocarbons. More particularly, it is concerned with the removal and/or reduction in content of so-called "peroxides" from liquid hydrocarbons such as cracked hydrocarbons, which upon standing, particularly in contact with oxygen, accumulate oxygen addition products of unsaturated hydrocarbons occurring in the mixture of hydrocarbons and which are generally termed "peroxides."

Upon standing in storage in the presence of dissolved oxygen or in contact with an oxidizing atmosphere, cracked hydrocarbons, such as thermally and catalytically cracked gasoline, have a tendency to form "peroxides," which in turn promote gum formation probably by catalyzing polymerization of unsaturated hydrocarbons and/or by being polymerized themselves. Such peroxides and gum products formed as a result thereof are also formed in certain petroleum processing operations wherein a cracked hydrocarbon containing dissolved oxygen and/or unstable oxygen-containing products are contacted with active solid contacting agents, e. g. fuller's earth, and the like. The presence of the peroxides and the resulting gum are detrimental to the use or further handling of the oil, since they cause clogging of screens and carburetor parts, sticking of valves, undesirable discoloration and gradual deterioration of the product, and the like.

It is, therefore, a principal object of this invention to provide an improved process for reducing the peroxide content of hydrocarbon liquids. A further object is to economically and efficiently remove the peroxide-oxygen from hydrocarbons which have deteriorated in contact with oxygen or active oxygen-containing compounds. These objects will be more readily understood and other objects will become apparent from the detailed description of the invention.

Now, in accordance with the present invention, it has been found that these peroxides can be eliminated from the hydrocarbon oils containing them by a process which comprises contacting the oils containing the peroxides with an aqueous alkaline solution containing a small but effective amount of a reducing agent which is capable of being oxidized to a higher state of oxidation by the peroxides.

Generally described, the process of the present invention comprises contacting a hydrocarbon liquid containing peroxides or other active oxygen-containing oxidizing substances with an aqueous alkaline solution containing a substantial proportion of an alkaline substance such as an alkali metal hydroxide, a reducing agent such as a water-soluble sulfide salt of an inorganic or an organic base or a corresponding mercaptide in amount sufficient to react with a substantial proportion of the peroxides contacted thereby, to react with the peroxides to reduce them and in turn to be oxidized to sulfur compounds of a higher state of oxidation, and separating the thus de-peroxidized hydrocarbons from the aqueous solution.

The "peroxides" which are produced in hydrocarbon oils containing unsaturated hydrocarbons, upon contacting oxygen or other oxygen-containing oxidizing agent, are familiar to the art, although the exact nature of all of the substances which are thus broadly termed "peroxides" is not known. In the case of the olefins ($R_1$—CH=CH—$R_2$, $R_1$ and $R_2$ being organic radicals, generally hydrocarbons) the corresponding peroxides have been represented thus:

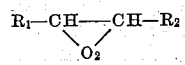

that is, an oxidized epoxide. It is generally considered that they are not peroxides of the character of the usual dialkyl peroxides such as di-isobutyl peroxide $$((CH_3)_2CH.CH_2\text{—}O\text{—}O\text{—}CH_2.CH(CH_3)_2)$$

In general, the peroxides to be found in cracked gasoline and other cracked petroleum products are relatively insoluble in the usual aqueous alkaline solutions since they contain four or more carbon atoms per molecule, generally six or more. Insofar as the oxidizing character and gum promoting capacity are concerned, dissolved oxygen is an undesirable constituent of hydrocarbons for the same reasons as are the peroxides, although it is not so strong an oxidizing agent as the peroxides. This dissolved oxygen is also removed by application of the process of the invention.

As examples of sulfide-containing reducing agents which are suitable for use in the practice of the invention may be mentioned sodium sulfide, potassium sulfide, other alkali metal sulfides, organic base sulfides such as piperidinium sulfide, quaternary ammonium sulfides (tetramethyl ammonium sulfide, trimethylbenzyl ammonium sulfide) and mercaptides such as alkyl mercaptides (methyl, ethyl, propyl, isopropyl, n-butyl, iso-butyl, tert-butyl mercaptides), aromatic mercaptides, (thiophenol, thiocresyl, thioxylenols, thionaphthol, etc.) aralkyl mercaptides such as benzyl, phenylethyl, etc. and substituted mercaptides containing polar groups in the hydrocarbon radical thereof. As suitable substances may be mentioned the mercaptides containing as substituent groups the hydroxyl, amino, carboxyl, nitro, sulfonic, phosphonic and the like polar groups. Representative substances are: 2-amino ethyl mercaptide, ortho-amino thiophenate, carboxy methyl mercaptide, ortho- and para-nitro thiophenates, ortho-, para-dinitro thiophenate, thiophenol sulfonic acids and thiophenol phosphonic acids.

As illustrative of the reducing substances which may be utilized in the practice of the invention are the antimonites, thioantimonites, arsenites, thioarsenites, hypophosphates, phosphites, hypophosphites, etc., including both inorganic salts and organic derivatives thereof. These and similar reducing agents may be used alone or together with the sulfide reducing agents referred to hereinabove.

In practicing the invention the alkali solution may be a simple aqueous solution of caustic alkali and water, plus the reducing agent such as a sulfide salt or the mercaptide (which may be added as the corresponding mercaptan) or, preferably, the alkali solution may contain solubility promoters such as alkali metal salts of water-insoluble aliphatic carboxylic acids (alkali metal isobutyrates), alkyl phenolates, alkali metal naphthenates, alkali metal aryl sulfonates, or mixtures thereof. The presence of the solubility promoter increases the efficiency of the process by decreasing the contacting time required for effective removal and or elimination of the peroxide. Instead of using the solubilizers, themselves, so-called acid oil extracts obtained by extracting various hydrocarbon oils containing phenates and naphthenates with caustic alkali are very effective solubilizers for use in the present invention. The use of solubilizers in the invention is preferred because of the insolubility of the usual peroxides in the alkali solution, which insolubility results in a relatively slow reaction in the absence of solubilizers. For instance, the heavier peroxides such as are found in heavier oils are more difficult to remove than are the lighter ones usually found in the lighter oils.

The process of the invention may be made more efficient by reducing the time of contacting required by also dissolving in the aqueous solution an organic oxidation catalyst which is capable of being oxidized to a quinone or quinonoid form and which quinone is capable of oxidizing hydrosulfides to neutral sulfur substances under the conditions of the process. As examples of such organic oxidation catalysts may be mentioned the polyhydroxy benzene compounds such as pyrogallol, catechol, butylpyrogallol, anthragallol, 3,4-dihydroxy diphenyl, gallic acid, digallic acid, tannic acid, hydroquinone sulfonic acid, 2,5-dihydroxy benzoic acid, ortho-nitrohydroquinone; the amino phenols such as para-aminophenol, 2,4-dinitro-6-aminophenol, 2,6-dinitro-4-aminophenol, 2,4-diamino-6-nitrophenol; and alkali soluble indigoid compounds such as indigo sulfonic acids, thioindigo sulfonic acids, etc.

Although it is preferable to utilize oxidizing catalysts as mentioned above simply as catalysts in the process, since these catalysts by their nature are reducing agents when in their reduced form and they are capable of reducing the peroxides themselves, the oxidation catalysts in reduced form may be used in larger proportions, in the substantial absence of the sulfides, to deperoxidize the peroxide-containing hydrocarbon liquid in a first step and then the aqueous alkaline solution containing the catalysts in oxidized (quinonoid) form may be contacted with the sulfide-containing reducing agent to reduce the quinonoid material with oxidation of the sulfide-containing material. The oxidized sulfur material may be removed by suitable means and the reduced catalyst material can then be recycled for deperoxidizing a further portion of hydrocarbon liquid. When following this method the catalyst material reducing agent should be utilized in sufficient proportions to minimize undesirable oxidation of the polyhydroxybenzene compound (catalyst) and the like to irreversible oxidation products, that is to products which can not be reduced again to the reduced state with usual reducing agents. In using this method, a sour hydrocarbon may be the source of the sulfide reducing agent.

In practicing an embodiment of the invention an aqueous alkali solution containing preferably sodium or potassium hydroxide in amounts of approximately 3 to 25% by weight, containing also a sulfide salt such as sodium or potassium sulfide in amounts of from about 1 to 15% by weight or a mercaptide, generally a mercaptide of a lower molecular weight hydrocarbon containing from 1 to 8 carbon atoms, in amounts of approximately 0.5 to 10% by weight (expressed on basis of corresponding mercaptan) and containing approximately 5 to 50% of acid oil extract comprising excess alkali and alkali metal alkyl phenolates and naphthenates is contacted with the gasoline or other hydrocarbon liquid from which peroxides are to be removed. Contact may be effected by any of the conventional methods for contacting two immiscible liquids. Suitable methods include (1) forcing the hydrocarbon liquid into and through a body of the alkali solution, (2) countercurrently contacting the hydrocarbon liquid and alkali solution in a tower packed with contacting and dispersing surfaces such as Raschig rings, Berl saddles, etc., (3) or by agitating the mixed solution and liquid in a suitable vessel and with a suitable agitating means. The extent of removal or conversion of the peroxides (and incidentally dissolved oxygen) is dependent primarily on the time of contact between the hydrocarbon liquid and the alkali solution, the type of dispersal of one liquid in the other and the relative amounts of peroxide and sulfide-containing reducing substance present. For a given set of contacting conditions, the rate of peroxide elimination depends also on the amount of solutizer present. It will be understood that although approximately 3 to 10% of solutizer is sufficient to render the process sufficiently rapid, larger amounts may be used dependent only on the solubility relationships encountered. The use of larger amounts of solutizers is especially desirable when treating heavier (higher boiling) hydrocarbon fractions.

The contact between the hydrocarbon liquid to be treated and the alkali solution may be effected at atmospheric temperature and pressure, although superatmospheric pressure may be used if desired, and temperatures above atmospheric increase the speed of the reaction and are desirable, but preferably it should not be above the boiling temperature of either the hydrocarbon liquid or the alkali solution under the existing pressure conditions.

While the peroxides in the hydrocarbon liquids are very reactive chemically, compared with dissolved oxygen, the peroxide is not soluble in the aqueous phase, and, therefore, does not react very rapidly in the absence of solubilizing agents. It is for this reason that it is preferred to employ solutizing solutions containing reducing agents, thus permitting the peroxides to more effectively contact or enter the aqueous phase for reaction. For this purpose, the addition of lower alcohols such as methyl and isopropyl alcohols may be employed although it is preferred to use salts of water-insoluble fatty acids and alkyl phenolates.

The peroxides have a sufficiently high oxidation potential to readily oxidize alkyl phenols present in acid oil extract solutizer solution to colored quinones. The addition of highly reactive reducing agents such as sodium sulfide or mercaptans to the solution protects the phenols from this oxidation. Mercaptans are the easiest to oxidize and are to be preferred for treating hydrogenation plant feeds inasmuch as the disulfides produced and taken up by the feed hydrocarbons can be removed during the hydrogenation. Normally the quantity of disulfides introduced into the hydrocarbon liquid by the process (corresponding to the reduction in peroxide content) will not greatly affect the quality of a gasoline even if it is not removed in subsequent process operations.

In order to build up sufficiently high protective concentrations of sulfide-containing material in the solution without introducing difficulties associated with hydrocarbon extraction of mercaptans from the alkali solution, the use of lower molecular weight mercaptides (mercaptans) is preferable, e.g. methyl and ethyl mercaptans or their mercaptides. When inexpensive solutizer solutions of the type of strong acid oil extracts are used, then reducing agents of the $Na_2S$ type are desirable because they avoid contamination of the hydrocarbon stream. Of course, disposal of the solution will be required (or its regeneration) when the inorganic oxidation products become excessive. Generally, the oxidation products are water-soluble compounds such as thiosulfates and sulfates. Any free sulfur which may be formed in some cases may be separated by well known separation methods. In general, of course, free sulfur which is formed in the presence of the sulfide will soon react further and be converted to thiosulfates, etc.

In order to demonstrate the invention, a number of examples are given below in which various peroxide-containing hydrocarbon liquids were contacted with various treating solutions for the purpose of eliminating the peroxides. The results are shown graphically in Figures I, II, III and IV, respectively, forming a part of this specification.

*Example I*

Four parts by volume of a previously stored flashed distillate gasoline having a peroxide number of about 7.3 as determined by the method set forth in Industrial and Chemical Engineering, volume 23, pp. 1254–9 (1931) and one part of a treating agent were vigorously agitated together in a closed vessel, using a mechanical shaking machine, and samples of the gasoline were analyzed at regular time intervals during the agitation to determine the peroxide number thereof. The results are shown graphically in Fig. I. The treating solution was 6 N KOH, 1.5 N potassium isobutyrate, about 1 N potassium alkyl phenolate (identified as K 20 Solutizer Solution in Fig. I) and contained 5% by weight $Na_2S \cdot 9H_2O$ and 0.3% by weight of pyrogallol as oxidation catalyst. It will be seen from Fig I that the peroxide number of the gasoline was reduced about 50% in about 3 minutes and to a value of about 1.3 in 10 minutes.

*Example II*

About seven parts by volume of a catalytically cracked flashed distillate gasoline having a peroxide number of about 7.2 was vigorously agitated as in Example I with one volume of a dilute acid oil extract (about 14° Bé.) solution containing excess of caustic alkali, alkali naphthenates and alkyl phenolates and also sodium sulfide and sodium mercaptides. After ten minutes of treatment, one volume of isopropyl alcohol was added to the mixture and the treatment continued. The analytical results are shown graphically in Fig. II. It will be noted that whereas the low peroxide value of about 2. was reached within 10 minutes, which as indicated on the graph was the limiting value for the dilute extract on heavier peroxides, the addition of the isopropyl alcohol gave a further appreciable reduction in the peroxide number.

*Example III*

Five volumes of an aromatic distillate with a peroxide number of about 9.2, which had been in storage for seven months, was treated with 1.5 volumes of a strong acid oil extract (24.0° Bé.) containing excess caustic alkali, alkali naphthenates and alkyl phenolates, 1% by weight sulfur as sodium sulfide, 1.5% by weight sulfur as sodium mercaptides and about 0.4% by weight of naturally occurring polyhydroxybenzene compounds. The analytical results are shown graphically in Fig. III.

*Example IV*

Four samples of a catalytically cracked flashed distillate $C_6$ fraction—67.4° A. P. I. (122–172° F. b. range) were contacted separately with 30% by volume of four different treating solutions, in the manner as described in Example I. The analytical results are shown graphically in curves A, B, C and D, respectively, of Fig. IV. The treating solutions and observations on the results were as follows:

A. 10% by weight NaOH containing 5% by weight $Na_2S \cdot 9H_2O$. Lack of solutizing action failed to remove more of the heavier peroxides.

B. Solution (A) plus 0.2% by weight of pyrogallol catalyst. Solutizing action again was lacking.

C. A strong acid oil extract containing alkali alkyl phenolate solutizers, about 1% by weight of sulfur as $Na_2S$ and about 1.5% by weight of sulfur as mercaptide, but without any oxidation catalyst. The peroxide reaction was rapid through the solutizing action of the acid oil extract solutizer agents.

D. A strong acid oil extract similar to that of (C) but also containing about 0.4% by weight of naturally occurring polyhydroxybenzene compounds.

I claim as my invention:

1. The method of removing peroxides from a refined gasoline hydrocarbon fraction free from hydrogen sulfide and mercaptan acidic constituents and which has deteriorated during storage comprising intimately contacting said oil with an aqueous alkali solution containing, as a reducing agent for said peroxides and added from an extraneous source, from about 1% to about 15% by weight, based on the aqueous solution, of sodium sulfide.

2. The method of removing peroxides from a refined gasoline hydrocarbon fraction free from hydrogen sulfide and mercaptan acidic constituents and which has deteriorated during storage comprising intimately contacting said oil with an aqueous alkali solution containing, as a reducing agent for said peroxides and added from an extraneous source, an alkali metal inorganic sulfide.

3. The method of removing peroxides from a refined gasoline hydrocarbon fraction free from hydrogen sulfide and mercaptan acidic constituents and which has deteriorated during storage comprising intimately contacting said oil with an aqueous alkali solution containing as agents added from an extraneous source, an alkali metal inorganic sulfide as reducing agent for said peroxides and an aqueous alkali-soluble alkali metal salt of a water-insoluble organic acid as aqueous-solubilizing agent for said peroxides.

4. The method of removing peroxides from a refined gasoline hydrocarbon fraction free from hydrogen sulfide and mercaptan acidic constituents and which has deteriorated during storage comprising intimately contacting said oil with an aqueous alkali solution containing as agents added from an extraneous source, an alkali soluble mercaptide as reducing agent for said peroxides and a solubilizing amount of an alkali metal alkylphenolate.

5. The method of removing peroxide from a refined gasoline hydrocarbon fraction free from hydrogen sulfide and mercaptan acidic constituents and which has deteriorated during storage comprising intimately contacting said oil with an aqueous alkali solution containing as agents added from an extraneous source, an alkali metal inorganic sulfide as reducing agent for said peroxides, a solubilizing amount of an alkali metal alkylphenolate and a minor but catalytically active amount of a phenolic substance which is capable of being oxidized to the quinone structure.

6. The method of removing peroxides from a refined gasoline hydrocarbon fraction free from hydrogen sulfide and mercaptan acidic constituents and which has deteriorated during storage comprising intimately contacting said oil with an aqueous alkali solution containing as agents added from an extraneous source, an alkali soluble alkali metal sulfide capable of yielding in aqueous solution a sulfide ion selected from the group consisting of inorganic sulfide ions and mercaptide ions as reducing agent for said peroxides and a solubilizing amount of an alkali metal alkylphenolate.

7. The method of removing peroxides from a refined gasoline hydrocarbon fraction free from hydrogen sulfide and mercaptan acidic constituents and which has deteriorated during storage comprising intimately contacting said oil with an aqueous alkali solution containing as agents added from an extraneous source, an alkali soluble sulfide capable of yielding in aqueous solution a sulfide ion selected from the group consisting of inorganic sulfide ions and mercaptide ions as reducing agent for said peroxides and a solubilizing amount of an alkali metal alkylphenolate.

8. The method of removing peroxides from a refined gasoline hydrocarbon fraction free from hydrogen sulfide and mercaptan acidic constituents and which has deteriorated during storage comprising intimately contacting said oil with an aqueous alkali solution containing as agents added from an extraneous source, an alkali soluble sulfide capable of yielding in aqueous solution a sulfide ion selected from the group consisting of inorganic sulfide ions and mercaptide ions as reducing agent for said peroxides and a solubilizing amount of an aqueous alkali-soluble alkali metal salt of a water-insoluble organic acid as aqueous-solubilizing agent for said peroxides.

LLOYD C. FETTERLY.

REFERENCES CITED

The following references are of record in the file of this patent:

UNITED STATES PATENTS

| Number | Name | Date |
|---|---|---|
| 1,540,218 | Maloney | June 2, 1925 |
| 2,081,309 | Schulze | May 25, 1937 |
| 2,115,781 | Morrell | May 3, 1938 |
| 2,279,277 | Shoemaker | Apr. 7, 1942 |
| 2,427,212 | Henderson et al. | Sept. 9, 1947 |
| 2,435,732 | Ayers et al. | Feb. 10, 1948 |

OTHER REFERENCES

Cassar: Ind. & Eng., 23, 1132 to 1134 (1931).